United States Patent [19]

De Bruijne et al.

[11] Patent Number: 5,038,572

[45] Date of Patent: Aug. 13, 1991

[54] AUTOMATED PROCESS FOR THE PREPARATION OF AN EDIBLE FAT-CONTAINING PRODUCT AND APPARATUS FOR CARRYING OUT SUCH A PROCESS

[75] Inventors: Pleun De Bruijne, Maassluis; Jacobus Van Eendenburg, De Lier; Hendrik J. Human, Maasland, all of Netherlands

[73] Assignee: Van den Bergh Foods Co., Division of Conopco, Inc., Lisle, Ill.

[21] Appl. No.: 348,329

[22] Filed: May 5, 1989

[30] Foreign Application Priority Data

May 10, 1988 [EP] European Pat. Off. ........... 88200924

[51] Int. Cl.⁵ ...................... A23G 9/00; B02C 25/00
[52] U.S. Cl. .......................................... 62/68; 99/486; 426/524; 62/136
[58] Field of Search .................. 62/68, 135, 157, 342, 62/136; 426/519, 524, 417; 99/486

[56] References Cited

U.S. PATENT DOCUMENTS

| | | | |
|---|---|---|---|
| 2,745,750 | 5/1956 | Shafer et al. | 426/417 X |
| 2,853,390 | 9/1958 | McGowan et al. | 426/417 X |
| 2,910,363 | 10/1959 | Rubin et al. | 426/417 |

FOREIGN PATENT DOCUMENTS 130642 1/1985 European Pat. Off.
3704072 2/1987 Fed. Rep. of Germany.

Primary Examiner—William E. Wayner
Attorney, Agent, or Firm—Rimma Mitelman

[57] ABSTRACT

Apparatus for chilling and working fat-containing compositions, comprising:
(a) means for chilling a composition passed therethrough,
(b) a crystallizer-unit, comprising a rotor, suitable for working the fat-containing composition, placed downstream of said chilling means,
(c) means for measuring the rotation speed of the rotor of the crystallizer-unit, and/or means for measuring the residence time of the fat-containing composition in the crystallizer-unit, which means are able to generate a signal responsive to the rotation speed of or residence time in the crystallizer-unit,
(d) computing means which, on the basis of the signals generated by means (c), are able to calculate target values for the residence time and/or rotation speed, and
(e) controlling means which may adjust the residence time and/or rotation speed of the crystallizer-unit in accordance with the target values calculated by (d) for the residence time and/or rotation speed.

8 Claims, 3 Drawing Sheets

AUTOMATED PROCESS FOR THE PREPARATION OF AN EDIBLE FAT-CONTAINING PRODUCT AND APPARATUS FOR CARRYING OUT SUCH A PROCESS

The present invention relates to a process for the preparation of an edible fat-containing product, comprising chilling at least part of the fat phase of said product, and subsequently feeding the chilled fat through a crystallizer-unit, the chilled fat on entering the crystallizer-unit having a solid fat content of at least 0.5 wt. %.

The above process is well known in the art and commonly used in the manufacture of fat products such as margarine, halvarine, shortenings, etc. The final characteristics of such fat-containing products heavily depend on the processing conditions applied in the manufacture of such products. Examples of processing conditions which influence the product's final characteristics are the residence times within the various processing-units (e.g. A-, B- and C-units), the amount of working in the units and the amount of chilling applied.

The large influence of the processing-conditions on the properties of the final product may partly be explained from the crystallization-behaviour of the fat-phase as present in such a product. Due to the phenomenon called polymorphism, triglycerides as present in oils and fats can crystallize in stable and unstable forms, depending on their crystallization structure. The instable, or metastable, forms are obtained by rapid chilling to a temperature below the melting point. The most instable form is called the alpha-form. The most stable form is the beta-form and in between the former two forms is the beta'-form. Besides these main forms various other crystallization forms exist, which however do not need to be discussed here.

In the manufacture of many fat-containing products a fluid oil-containing composition is quickly and deeply chilled, resulting in the crystallization of part of the fat to a metastable crystal modification, whereafter transformation to, for example, the beta'-form takes place in crystallizers (C-units), resting tubes (B-units), and during storage of the product. The transition of the metastable crystals to more stable crystals is accompanied with an increase in the solids content of the chilled fat.

As it is important to control the solids content of the fat during processing, it is thus important to control the extent to which conversion of the metastable to a more stable form takes place. Commonly this problem is solved by applying long residence times (i.e. large and/or many B-and C-units) to make sure that the metastable form is almost completely converted to a more stable form (mostly the beta'-form), so that the maximum solids content at said temperature is nearly reached. This approach, however, does not allow the partial conversion of the metastable form to a more stable form, which partial conversion may be beneficial for some types of products. Moreover this approach leads to an over-dimensioning of processing-units.

It has been found now that, given a certain fat blend, there exists a relationship between on the one hand the degree of crystallization in the crystallizer-unit and on the other hand the residence time in the crystallizer-unit and the intensity of working in the crystallizer-unit. Thus by adjusting the processing conditions, i.e. the residence time and/or working intensity in the crystallizer-unit, which influence the conversion of fat crystals from the metastable to a more stable form, it is possible to control the degree of conversion, and thereby the degree of crystallization, at a certain stage of the process.

The present invention therefore relates to a process for the preparation of an edible fat-containing product, comprising:

a) chilling at least part of the fat phase of said product, and subsequently b) feeding the chilled fat through a crystallizer-unit, the chilled fat on entering the crystallizer-unit having a solid fat content of at least 0.5 wt. %, more preferably of at least 1 wt. %, and c) controlling the degree of crystallization in the crystallizer-unit by adjusting the residence time and/or the intensity of working in said crystallizer-unit according to an experimentally derivable relationship between on the one hand the degree of crystallization in the crystallizer-unit and on the other hand the residence time in the crystallizer-unit and/or the intensity of working in the crystallizer-unit.

It is to be understood that whenever used here, the term "control" does not encompass manual control by humans. Instead when used here, the term control relates to automatic control which, when operative, does not require any human act.

Here the crystallizer-unit may be any kind of apparatus which allows the conversion of fat crystals from their metastable to a more stable form. Preferably the crystallizer-unit is constructed in such a manner that a (super)chilled- fat-containing composition, when passed through said crystallizer-unit, is subjected to shear, inducing conversion of metastable fat crystals to a more stable form. Moreover, the crystallizer-unit, as applied in the present process, preferably, is essentially non-cooled.

Figure 1:
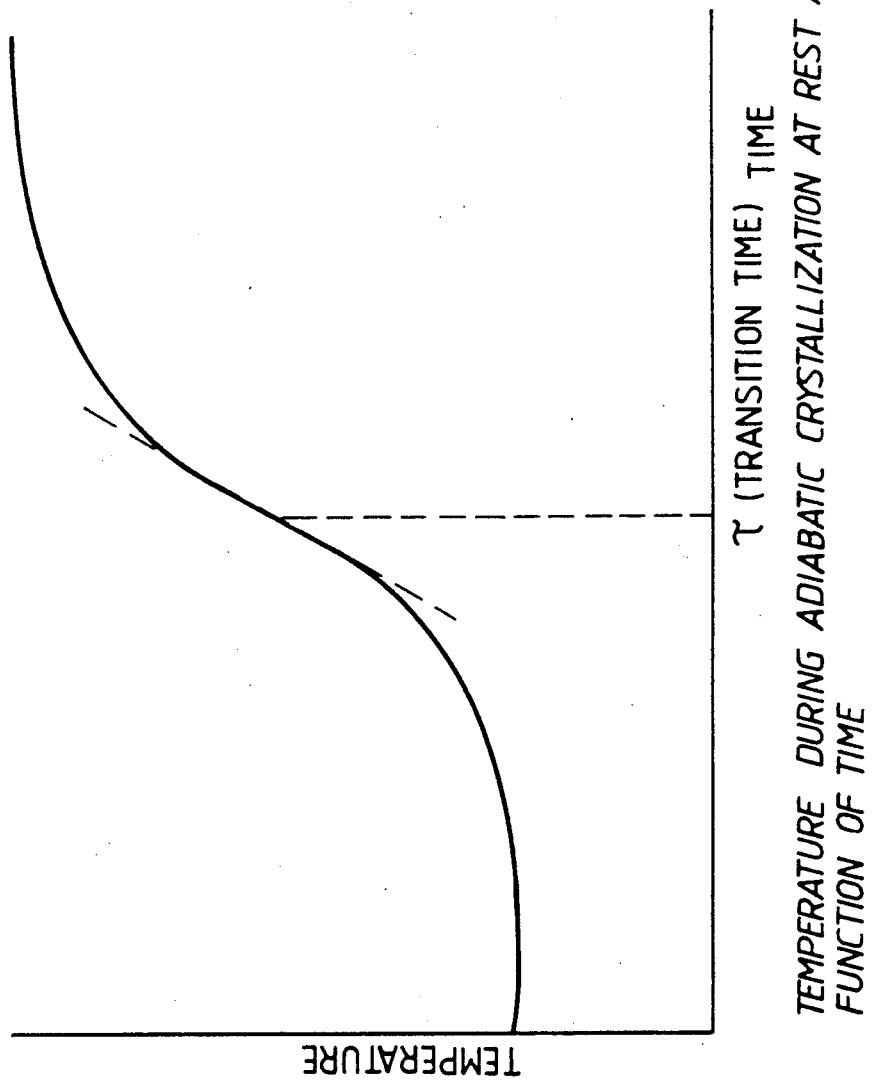
FIG. 1 represents the adiabatic crystallization curve of a certain fat blend.

In the present process the residence time and/or the intensity of working are adjusted to maintain the degree of crystallization at a fairly constant level. By increasing the residence time additional fat crystals will be formed, whereas a decrease in residence time results in the opposite effect; i.e. less fat crystals being formed. Moreover it was also found that by increasing the intensity of working to which the chilled fat phase is subjected, the amount of fat crystals formed may be increased. Thus it is possible to control the amount of fat crystals formed in the crystallizer-unit by means of the residence time and/or working intensity. In traditional processing of fat-containing products the working intensity, e.g. the rotation speed, is maintained at a constant level.

If in the process according to the invention the residence time is kept constant, the degree of crystallization may be controlled by adjusting the intensity of working in the crystallizer in accordance with an experimentally determined relationship between the degree of crystallization and the intensity of working, for that particular residence time. If, alternatively, the intensity of working is kept constant, the degree of crystallization may be controlled by adjusting the residence time according to the relationship between the degree of crystallization and the residence time, at that particular intensity of working.

In either of the above approaches the degree of crystallization may be maintained at a constant level by monitoring the solid fat increase obtained in the crystallizer and adjusting the residence time or rotation speed so as to compensate fluctuations in the degree of crystallization observed in said crystallizer. Also the present process makes it possible to compensate fluctuations in residence time by adjusting the rotation speed and vice versa of fluctuations in the rotation speed by adjusting the residence time in the crystallizer, so as to maintain an essentially constant degree of crystallization in the crystallizer. The solid fat content of a fat-containing composition may be determined by, for instance, by measuring the in-line density of the fat-containing composition, which is correlated with the solid fat content of said composition or, alternatively, by means of on-line pulse-NMR.

In the present process fluctuations in the degree of crystallization obtained in the crystallizer can be compensated by either adjusting the rotation speed or the residence time. Alternatively, however, it is also possible to compensate for fluctuations in the degree of crystallization by adjusting both the rotation speed and the residence time. The latter approach may be advisable in a situation where, for instance, the rotation speed would have to be set at an undesirable high or low speed.

It is surprising that for a given fat blend, containing a certain amount of crystallized fat when entering the crystallizer-unit, the degree of crystallization in the crystallizer-unit may be controlled effectively by means of not more than two parameters, as unexpectedly, for instance, the temperature of the fat after the (super) chilling step, as well as the physical properties of the fat blend, other than the crystallization-rate which will be discussed below, appear to be of only minor influence on the degree of crystallization observed.

If in the present process the chilled fat is not in a super-chilled state, no additional crystallization can be induced by adjusting the residence time and/or the working-intensity in the crystallizer-unit. Thus the fat subjected to the chilling step, on entering the crystallizer-unit, should be in a super-chilled state. Here by fat in a super-chilled state is meant that the solid fat content of the fat, at the temperature of said 6 L 7124 (R) fat, is lower than the solid fat content of said fat, at the same temperature, when crystallized to equilibrium, i.e. when crystallized in its most stable form.

It was found that, in general, the degree of crystallization in the crystallizer-unit not solely depends on the residence time and the intensity of working in the crystallizer-unit, but also on the crystallization-rate of the fat. Therefore in a preferred embodiment of the present invention the degree of crystallization of fat in the crystallizer-unit is controlled by adjusting the residence time and/or the intensity of working in said crystallizer-unit according to an experimentally derivable relationship between on the one hand the degree of crystallization in the crystallizer-unit and on the other hand the crystallization-rate of the fat, the residence time in the crystallizer-unit and/or the intensity of working in the crystallizer-unit. Thus, in this preferred embodiment, the present process will also deal with variations in the crystallization rate of the fat blend in use, and as a function of said crystallization rate adjust the working intensity and/or residence time to the appropriate level(s).

By crystallization-rate as used here, is meant a parameter which indicates how fast a fat crystallizes under certain conditions. Such a parameter distinguishes for example slow-crystallizing fats from fast-crystallizing fats. An example of a parameter that may be used as an indication of the crystallization-rate is the so called transition time. The transition time for a certain fat blend may be determined from the adiabatic crystallization curve, which for most commercially used fat blends is of a sigmoid form. The adiabatic crystallization curve is obtained by rapidly chilling a fat blend, followed by measuring, under adiabatic conditions, the temperature of the blend as a function of the time. The time at which the sharpest increase in temperature is observed is called the transition time. In FIG. 1 the adiabatic crystallization curve for a certain fat blend is represented. In said figure the transition time for that particular fat blend has been indicated. Of course the transition time measured depends on the chilling step applied. Therefore to allow a good comparison between different fat blends, it is recommendable to apply a standard chilling step to determine the transition time for the various blends.

The relationship between on the one hand the degree of crystallization in the crystallizer-unit and on the other hand the crystallization rate of the fat blend, the residence time and working conditions in the crystallizer-unit, depends on the kind of production line used and may be derived experimentally. When determining such an experimental relationship, the degree of crystallization of a fat-containing composition in a crystallizer-unit can, for instance, suitably be defined as the quotient of the increase in solid fat-content observed in the crystallizer-unit, and the increase in solid fat-content observed when a fat-sample is taken immediately before the crystallizer and allowed to crystallize to equilibrium under adiabatic conditions. Thus defined, the degree of crystallization can range from 0.0 to 1.0.

Whenever referred to in this application the solids content of a fat is determined by means of NMR using the method described in "Fette, Seifen, Anstrichmittel", 80 (1978), 180–186.

The intensity of working, in case such working is accomplished by means of rotating elements, may, for example, suitably be defined as the rotation speed, as the intensity of working appears to be proportional to the rotation speed. In case the crystallizer-unit comprises no rotating or other moving elements, the intensity of working in general is found to be proportional to the linear velocity of the composition passing through the device. An example of a crystallizer-unit comprising no rotating or moving elements is a so called static mixer.

The residence time can properly be defined as the quotient of the volume of the crystallizer-unit and the volume-throughput. Thus, for example, if the volume of the crystallizer-unit is kept constant the (reciprocal) volume-throughput may be used as a measure for the residence time and vice versa.

It was found that the relationship between on the one hand the degree of crystallization observed in the fat after leaving the crystallizer-unit, and on the other hand the residence time and the intensity of working in the crystallizer unit, and the crystallization-rate of the fat phase subjected to the chilling step, in general, can be represented by a single formula. Thus in a preferred embodiment the present invention relates to a process wherein the residence time and/or the intensity of working in the crystallizer-unit are adjusted according to a relationship which can be represented by the following formula:

$$E <> (t_c)^x \cdot (v_c)^y \cdot (d)^z$$

where
- E represents the degree of crystallization,
- $t_c$ is the residence time in the crystallizer-unit,
- $v_c$ represents the intensity of working in the crystallizer-unit,
- d represents the crystallization-rate of the fat subjected to the chilling step,
- x is within the range of from 0.5 to 2.0,
- y is within the range of from 0.1 to 1.0, more preferably within the range of from 0.3 to 0.8,
- z is within the range of from $-2.0$ to $-0.5$, and where $<>$ stands for: is proportional to.

A still better control of the degree of crystallization may be obtained if the exponents x, y, and z are within the following ranges: x between 0.7 and 1.4, y between 0.35 and 0.7, and z between $-1.5$ and $-0.7$.

Figure 2:
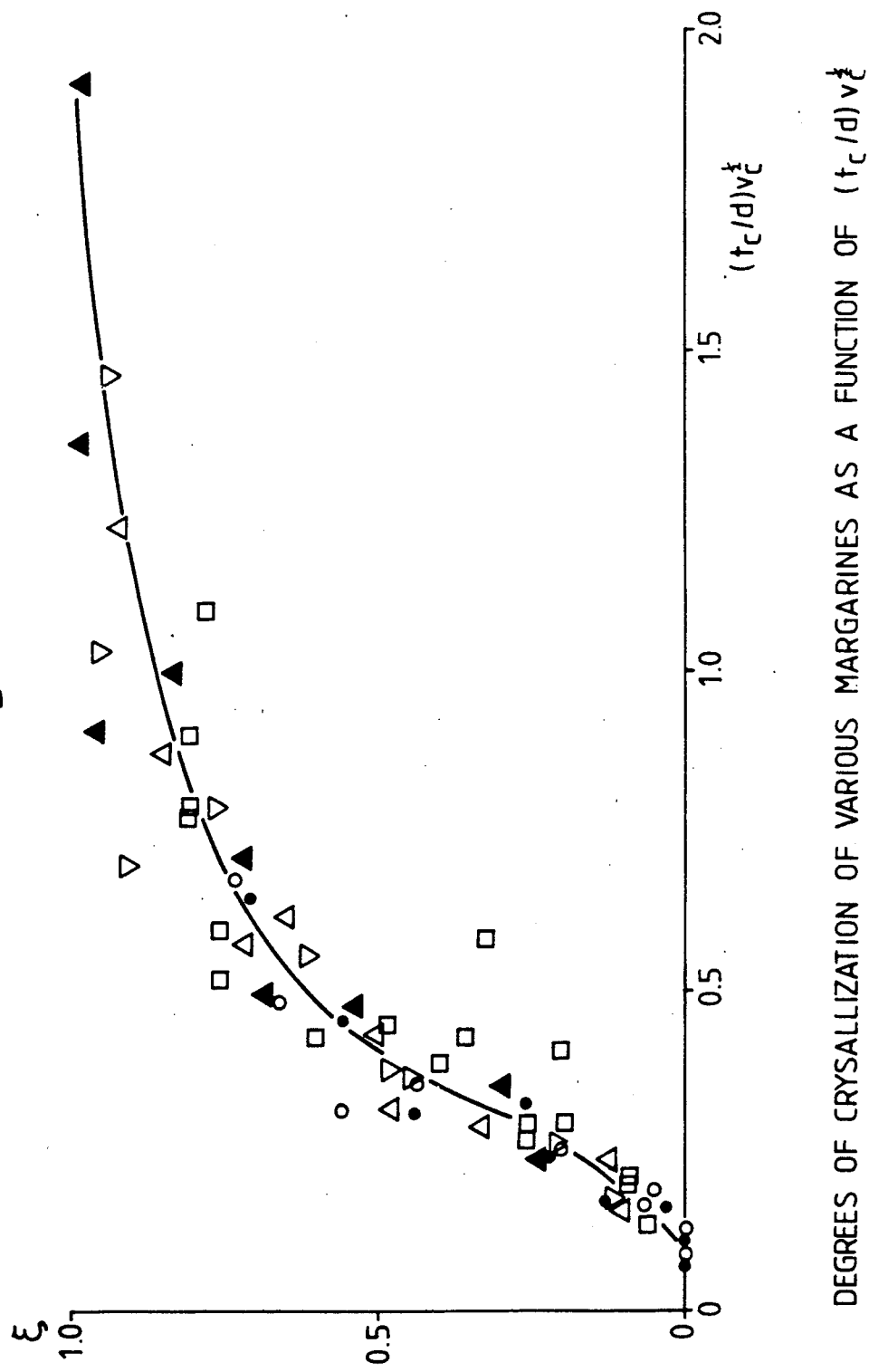
FIG. 2 represents the degree of crystallization of various margarine as a function of $(T_c) \cdot (v_c)^{\frac{1}{2}}/d$.

The above relationship, as may be seen from FIG. 2 wherein the degree of crystallization of various margarine as a function of $(T_c) \cdot (v_c)^{\frac{1}{2}}/d$ is represented, is particularly accurate as long as the degree of crystallization remains substantially below 100%. Thus in the present process the degree of crystallization obtained in the crystallizer-unit, defined as the quotient of the increase in solid fat-content in the crystallizer-unit, and the increase in solid fat-content found when a fat-sample is taken immediately before the crystallizer and allowed to crystallize to equilibrium under adiabatic conditions, preferably is less than 0.85, more preferably less than 0.7.

Since in general it is difficult to influence the residence time in the crystallizer-unit, because, in normal practice, the throughput is not allowed to fluctuate and because crystallizer-units normally have a fixed volume, it is preferred to use the intensity of working in said unit, to adjust the processing conditions.

In a preferred embodiment of the present invention the crystallizer-unit comprises a rotor. The rotation speed of the rotor may be taken as a suitable measure of the intensity of working in such a crystallizer-unit.

Preferably a crystallizer of the C-unit type is used as a crystallizer-unit according to the present process. In order to adjust the intensity of working in such a C-unit, the rotation-speed of the rotor, on which pins, or the like, are mounted, may be varied.

The chilling step in the present process may take place in any kind of chilling-apparatus, although it is preferred to use the devices which are normally used in the manufacture of fat-containing products, i.e. A-units (also called Votators {tradename}), chilled cavity transfer mixers, cooling coils, etc. Moreover these chilling devices preferably are used in such a manner that, when passed therethrough, the fat is not only chilled, but also subjected to shear, as shear promotes the formation of metastable fat-crystals.

In this application the words fat and oil are used interchangeably. By fat and oil is meant a triglyceride composition, but also non-toxic material having physical properties similar to those of triglycerides, which material may be indigestible, such as for example jojoba oil, or esters of fatty acids and sugars.

Although the present process may be applied in the preparation of all kinds of fat-containing products, it is preferred to use the process in the production of products mainly consisting of fat and/or water, such as bakery margarine, spreads, shortenings etc. Preferably the process is used in the manufacture of fat-containing products comprising a continuous fat-phase, and containing more than 80 wt. % of water and fat. More preferably the process is applied in the production of fat-containing products having a fat-content of at least 35 wt. %, more preferably of at least 65 wt. %.

The crystallization-rate of the chilled fat phase may be determined off-line, for example, by taking samples from the oil-container from which the oil is fed to the production line, but it is also possible to determine said crystallization-rate in-line, for instance, after the chilling step.

If the crystallization rate is determined off-line, this means that, in the conventional semi-continuous process, each fat blend batch is analyzed separately. For each batch, on the basis of the crystallization rate found, the process conditions, i.e. working intensity and/or residence time are then adjusted in accordance with the experimentally derived relationship.

In another embodiment of the present invention, the crystallization-rate is determined in-line. By measuring the temperature of the chilled fat-containing material upon entering and leaving the crystallizer-unit, the temperature increase of said material inside the crystallizer-unit can be established. The latter temperature increase, provided rotation speed and throughput remain constant, is a good measure of the rate of crystallization of the fat blend used. The use of the temperature increase as a measure of the rate of crystallization is particularly effective if the degree of crystallization observed in the crystallizer-unit is substantially lower than the maximum obtainable degree of crystallization.

Thus the processing conditions after the chilling step may be adjusted adequately in a fully automatic manner, taking into account the crystallization rate of the specific fat blend being fed to the cooling section of the production line at that moment Another aspect of the present invention is concerned with an apparatus for chilling and working fat-containing compositions, comprising:
(a) means for chilling a composition passed therethrough,
(b) a crystallizer-unit, comprising a rotor, suitable for working the fat-containing composition, placed downstream of said chilling means,
(c) means for measuring the rotation speed of the rotor of the crystallizer-unit, and/or means for measuring the residence time of the fat-containing composition in the crystallizer-unit, which means are able to generate a signal responsive to the rotation speed of or residence time in the crystallizer-unit,
(d) computing means which, on the basis of the signals generated by means (c), are able to calculate target values for the residence time and/or rotation speed, and
(e) controlling means which may adjust the residence time and/or rotation speed of the crystallizer-unit in accordance with the target values calculated by (d) for the residence time and/or rotation speed.

The means for chilling preferably is a Votator, a cooled cavity transfer mixer, a cooled static mixer or a cooling coil.

The crystallizer-unit present in the apparatus, preferably is a C-unit, a cavity transfer mixer or a static mixer, more preferably the crystallizer-unit is a C-unit.

The computing means in the present apparatus may be a programmed computer, but a similar effective control may be obtained if the apparatus comprises as computing means a relatively simple electronic circuit. Preferably, however, the computing means comprises a programmed computer.

Figure 3:
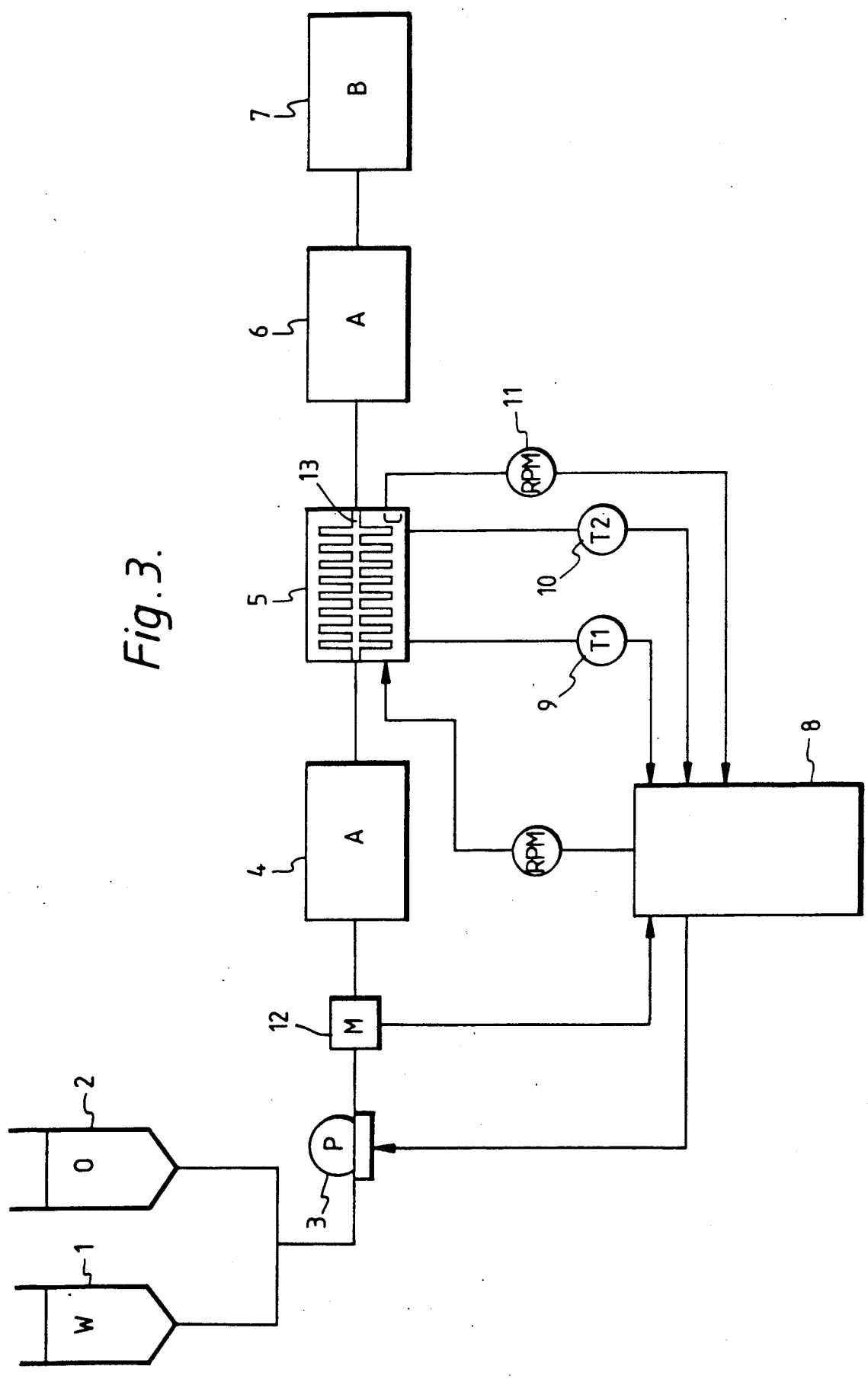

FIG. 3 is a block diagram illustrating the process and apparatus according to the present invention.

In FIG. 3 vessel 1 contains an aqueous solution and vessel 2 contains a fat blend. Pump 3 feeds the combined water and oil stream to Votator 4, after which the combined composition subsequently passes a C-unit 5 containing a rotor 13, a Votator 6 and a resting tube (B-unit) 7. Both Votator 4 and 6 are cooled by means of liquid ammonia.

Computer 8 receives input signals from temperature probes 9 and 10, from device 11 which measures the rotational shaft speed of the C-unit and from mass-flow meter 16. The computer 8, on the basis of an experimentally derived relationship, computes a suitable combination of residence time and working intensity for the particular fat blend passing through the production line at that moment, and adjusts the mass flow through pump 3 and/or the rotation speed of C-unit 5 accordingly. When computing a suitable combination for the residence time and working intensity computer 8, besides the working intensity and residence time, also takes into account the crystallization rate of the fat blend being processed.

The crystallization rate of the particular fat blend being processed is determined continuously by the computer 8 on the basis of the temperature difference observed between probes 9 and 10. If, for instance, the temperature difference observed between probes 9 and 10 increases, computer 8 will increase the mass flow through and/or reduce the rotation speed of the C-unit and thus maintain the degree of crystallization in the C-unit at an essentially constant level.

We claim:

1. Process for the preparation of an edible fat-containing product, comprising:
   a) chilling at least part of the fat phase of said product, and subsequently
   b) feeding the chilled fat through a crystallizer-unit, the chilled fat on entering the crystallizer-unit having a solid fat content of at least 0.5 wt. %, and
   c) controlling the degree of crystallization in the crystallizer-unit by adjusting the residence time and/or the intensity of working in said crystallizer-unit according to an experimentally derivable relationship between on the one hand the degree of crystallization in the crystallizer-unit and on the other hand the residence time in the crystallizer-unit and/or the intensity of working in the crystallizer-unit.

2. Process according to claim 1, wherein the degree of crystallization in the crystallizer-unit is controlled by adjusting the residence time and/or the intensity of working in said crystallizer-unit according to an experimentally derivable relationship between on the one hand the degree of crystallization in the crystallizer-unit and on the other hand the crystallization-rate of the fat subjected to the chilling-step, the residence time in the crystallizer-unit and/or the intensity of working in the crystallizer-unit.

3. Process according to claim 1, wherein the degree of crystallization obtained in the crystallizer-unit, defined as the quotient of the increase in solid fat-content observed in the crystallizer-unit, and the increase in solid fat-content found when a fat-sample is taken immediately before the crystallizer and allowed to crystallize to equilibrium under adiabatic conditions, is less than 0.85.

4. Process according to claim 1, wherein the residence time and/or the intensity of working in said crystallizer-unit are adjusted according to a relationship which may be represented by the following formula:

$$E <> (t_c)^x \cdot (v_c)^y \cdot (d)^z$$

where
  E represents the degree of crystallization,
  $t_c$ is the residence time in the crystallizer-unit,
  $v_c$ represents the intensity of working in the crystallizer-unit,
  d represents the crystallization-rate of the fat subjected to the chilling step,
  x is within the range of from 0.5 to 2.0,
  y is within the range of from 0.1 to 1.0, more preferably within the range of from 0.3 to 0.8,
  z is within the range of from $-2.0$ to $-0.5$, and
  where $<>$ stands for: is proportional to.

5. Process according to claim 1, wherein the crystallizer-unit comprises a rotor and where $v_c$ is the rotation speed of the rotor.

6. Process according to claim 1, wherein the crystallizer-unit is of the C-unit type.

7. Apparatus for chilling and working fat-containing compositions, comprising:
   (a) means for chilling a composition passed therethrough,
   (b) a crystallizer-unit, comprising a rotor, suitable for working the fat-containing composition, placed downstream of said chilling means,
   (c) means for measuring the rotation speed of the rotor of the crystallizer-unit, and/or means for measuring the residence time of the fat-containing composition in the crystallizer-unit, which means generate a signal responsive to the rotation speed of or residence time in the crystallizer-unit,
   (d) computing means which, on the basis of the signals generated by means (c), and taking into account the crystallization rate of the fat-containing composition, calculate target values for the residence time and/or rotation speed, and
   (e) controlling means for adjusting the residence time and/or rotation speed of the crystallizer-unit in accordance with the target values calculated by (d) for the residence time and/or rotation speed.

8. Apparatus according to claim 7, wherein the crystallizer-unit is a C-unit.

* * * * *